(12) United States Patent
Kadyk

(10) Patent No.: US 7,712,321 B2
(45) Date of Patent: May 11, 2010

(54) REVERSING AUGER SYSTEM

(75) Inventor: Jeffrey W. Kadyk, Sherman, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 895 days.

(21) Appl. No.: 10/509,361

(22) PCT Filed: Mar. 25, 2003

(86) PCT No.: PCT/US03/09125

§ 371 (c)(1),
(2), (4) Date: Jul. 17, 2007

(87) PCT Pub. No.: WO03/082022

PCT Pub. Date: Oct. 9, 2003

(65) Prior Publication Data

US 2008/0202130 A1    Aug. 28, 2008

Related U.S. Application Data

(60) Provisional application No. 60/367,532, filed on Mar. 25, 2002.

(51) Int. Cl.
A23G 9/12    (2006.01)
(52) U.S. Cl. .................................... 62/136; 62/342
(58) Field of Classification Search ............ 62/136, 62/342, 343
See application file for complete search history.

(56) References Cited

U.S. PATENT DOCUMENTS

| | | | |
|---|---|---|---|
| 4,081,346 A * | 3/1978 | Fogo et al. ................. 204/213 |
| 4,363,223 A | 12/1982 | Abbott | |
| 4,610,399 A * | 9/1986 | Weichenrieder .......... 241/101.8 |
| 4,696,166 A | 9/1987 | Bukoschek et al. | |
| 4,736,600 A | 4/1988 | Brown | |
| 4,900,158 A | 2/1990 | Ugolini | |
| 4,922,725 A | 5/1990 | Rasmussen | |
| 5,208,050 A | 5/1993 | Ney | |
| 5,271,572 A | 12/1993 | Grandi | |
| 5,464,120 A | 11/1995 | Alpers et al. | |
| 5,845,512 A | 12/1998 | Chase et al. | |
| 5,962,060 A | 10/1999 | Farrell | |
| 6,058,721 A | 5/2000 | Midden et al. | |
| 7,047,758 B2 * | 5/2006 | Ross ........................... 62/342 |

OTHER PUBLICATIONS

International Search Report from PCT/US03/09125, Aug. 12, 2003.

* cited by examiner

Primary Examiner—William E Tapolcai
(74) Attorney, Agent, or Firm—Barnes & Thornburg LLP

(57) ABSTRACT

A method and apparatus for producing a chilled or partially frozen beverage is provided. The system includes a beverage hopper (32) a chilling unit (44), a rotatable mixing member (38), a sensing member (230) for detecting an occurrence of a rotation reversal condition, a controller for generating a rotation reversal signal in response to the sensing member, and a drive motor (36) coupled to the mixing member for rotating the mixing member in a first direction and a second, reverse direction in response to a rotation reverse signal.

25 Claims, 7 Drawing Sheets

REVERSING AUGER SYSTEM

This Application is a U.S. Nationalization of PCT Application No. PCT/US03/09125, filed Mar. 25, 2003 and also claims the benefit of U.S. Provisional Patent Application No. 60/367,532, filed Mar. 25, 2002. The prior applications are expressly incorporated herein by reference in their entirety.

BACKGROUND AND SUMMARY

The present disclosure relates to an improved apparatus for producing a chilled or partially frozen beverage often referred to as a slush beverage. A variety of apparatus have been designed to produce chilled beverages as well as to produce beverages which are in slush form. Some of these apparatus are referred to as "granita" machines. Such apparatus can be used to produce slush beverages for a number of products including fruit juices, coffee-based beverages, tea-based beverages, dairy based beverages, as well as beverages containing alcohol. The apparatus include a chilling structure and some form of blade or auger which moves relative to the chilling portion to strip the frozen product off and circulate the beverage along the chilling portion. Circulation of the frozen beverage within the beverage hopper and along the chilling portion helps to reduce the temperature of the beverage mixture thereby causing the partially frozen beverage to approach a slush consistency. There is a need for an improved chilled beverage producing apparatus.

One problem with the prior frozen beverage apparatus is that the rotatable augers of such machines typically induce an "ice hump" condition within the beverage hopper in which frozen beverage product collecting at the top of the hopper toward its front end. This condition is most common during a "freeze down" mode of operation of the machine which occurs when a substantial quantity of warmed beverage in the beverage hopper is rapidly chilled to being it to a slush or partially frozen condition.

A "freeze down" event is defined for purposes of this application as the time period required to chill and mix a quantity of warmed liquid beverage within the beverage hopper until a partially frozen beverage of adequate serving quality can be dispensed. A "freeze down" events typically occurs either after (a) the machine is partially re-filled with beverage products during periods of heavy use, (b) it is reactivated from a "night mode" operation, or (c) the initial filling of the beverage hopper after cleaning. As the ice crystals are scraped off the chilling structure, they rise in the beverage hopper since the crystals are less dense than the warmed beverage in the lower portion of the hopper. At the same time those ice crystals are rising due to their buoyancy, they are also being pushed forward and upward by the action of the auger. In prior devices, the "ice hump" would typically break up after it becomes large enough to collapse under its own weight and to fall back into the lower portion of the container. This collapse can take a considerable period of time to occur. As a result, the formation of an "ice hump" substantially slows the time period required for the system to complete a "freeze down" event.

Another problem that arises is that the chilled beverage product can become less uniformly mixed within the beverage hopper than is desirable. This can cause inconsistencies in the frozen beverage product from serving to serving. Lack of uniform mixing with the prior rotatable augers is often due to stagnant areas forming within the beverage hopper which are not homogeneously mixed with the remainder of the frozen beverage. Typically, these stagnant corners further contribute to inconsistencies in the beverage product.

One prior attempt to deal with the problems of delayed freeze down and insufficient product mixing has been to provide a second auger or mixing mechanism for breaking up the "ice hump" or stagnant corners within the beverage. This approach has the drawback of increasing the cost of the frozen beverage machines, their complexity, as well as creating difficulties in servicing them. Such two auger machines also have a tendency to mix air into the partially frozen beverage which causes undesirable "frothing" of the product. It is one object of the invention to provide a cost efficient partially frozen beverage machine having an improved mixing apparatus and method for providing a more consistent frozen beverage product.

It is another object of the invention to provide an improved mixing apparatus and method of using same that substantially prevents the formation of an "ice hump" or rapidly breaks up any "ice hump" that begins to form thereby providing rapid completion of a "freeze down" event.

The present disclosure is directed to an improved apparatus for producing a partially frozen beverage which includes a beverage hopper for retaining a quantity of partially frozen beverage, a rotatable mixing member, a chilling unit for cooling the beverage within the hopper, a sensing member for detecting the occurrence of a rotation reversal condition, a controller for generating a rotation reversal signal, and a drive motor operably coupled to the rotatable mixing member for rotating the mixing member in a first direction during normal operation and in a second, reverse direction in response to a rotation reversal signal. The reverse rotation of the rotatable mixing member improves the efficiency of the mixing of partially frozen beverage within the beverage hopper and is effective in speeding the conclusion of a "freeze down" event relative to prior "forward rotation only" beverage apparatus. Further, the machines disclosed may be designed with a single mixing member, rather than the more costly multiple mixing member machines sometimes used with prior machines.

In one preferred embodiment of the present invention, the sensing member is programmed to detect a "freeze down" event of a certain duration as a rotation reversal condition. During this operation, the chilling unit is maintained below a pre-determined temperature for periods of greater than about ten (10) minutes. Such operation conditions are likely to produce an "ice hump." Reversal of the rotatable member prevents or limits this occurrence by pulling ice crystals from the top-front portion of the machine and mixing them with the contents of the remainder of the beverage hopper. This causes more rapid "freeze down" of the beverage as complete mixing does not require waiting for collapse of the "ice hump" under its own weight. Where all or large portions of the beverage product is in liquid rather than partially frozen form, it may be necessary to cycle between forward rotation and reverse rotation repeatedly during a "freeze down" event. Preferably a torque sensor is also provided to sense the torque at the drive shaft of the drive motor. The torque sensor detects a torque valve that is correlated with a high quality product consistency. Once the selected torque value is detected, the flow of coolant into the chilling unit associated with beverage hopper is switched to an "off/ice" position. During the reverse rotation phase, the torque sensor is preferably deactivated so that it does not interfere with the operation of apparatus because reverse rotation may cause temporary fluctuations in measured torque which are not indicative of product quality.

In another preferred embodiment of the invention, the sensing member may be a timer that discerns that the rotatable mixing member has been rotating in a first direction for a pre-determined period of time that is indicative of incomplete mixing or stagnation in the corners of the beverage hopper. Reversal of the direction of rotation of the auger for a pre-determined period of time causes reverse circulation of the partially frozen beverage such that any stagnate frozen beverage is mixed with the remainder of the beverage. This results in a more homogeneously mixed frozen beverage product. Preferably, the timer is further programmed to detect a pre-determined period of reverse direction rotation. In response thereto, a forward rotation signal is generated and communicated to the drive motor. The drive motor is then caused to alter its rotation back into a normal, forward rotation mode until the pre-determined time period again lapses and a new reverse direction rotation cycle may be initiated.

BRIEF DESCRIPTION OF THE DRAWINGS

The organization and manner of the structure and function of the invention, together with the further objects and advantages thereof, may be understood by reference to the following description taken in connection with the accompanying drawings, and in which.

DETAILED DESCRIPTION OF THE ILLUSTRATED EMBODIMENT

Figure 1:
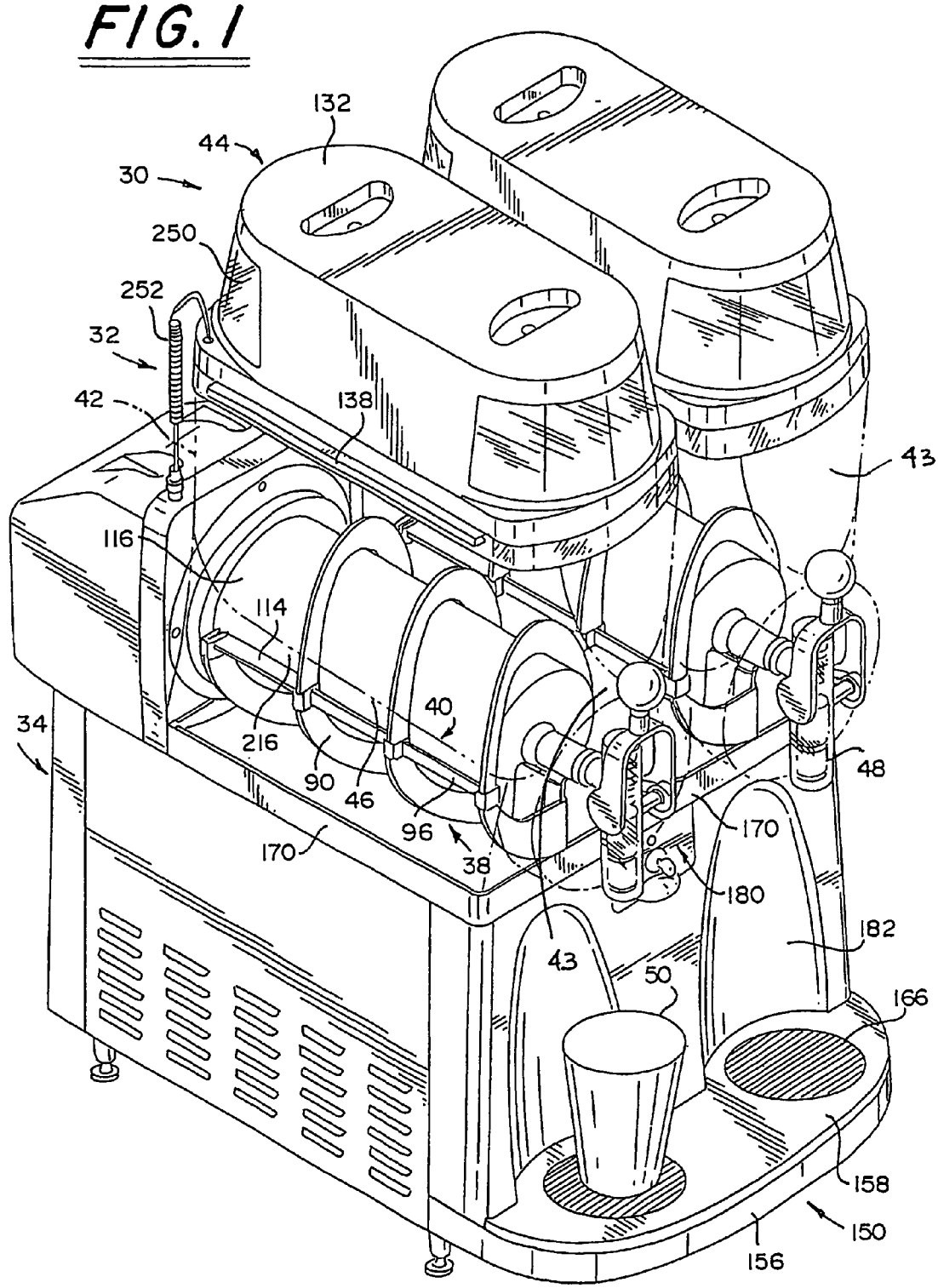
FIG. 1 is a top, front, left-hand perspective view of a slush beverage apparatus.
Figure 2:
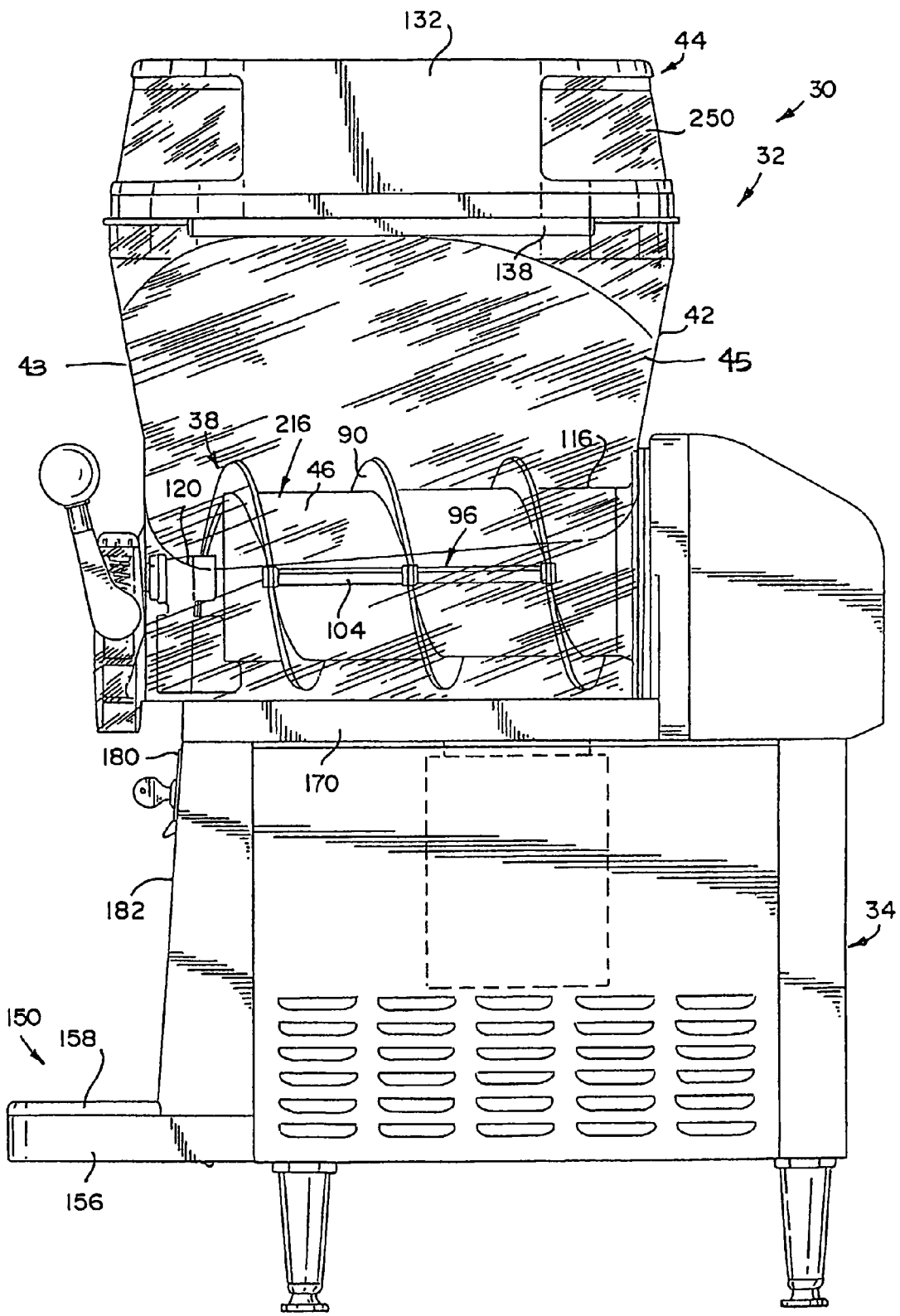
FIG. 2 is a right-side, partial fragmentary elevational view of the apparatus as shown in FIG. 1 with the beverage hopper filled with frozen beverage.

While the present disclosure may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

With reference to the figures, a chilled or slush beverage apparatus 30 is shown in perspective in FIG. 1. The beverage apparatus 30 includes at least one hopper assembly 32 which is retained on a housing 34. As will be described in greater detail hereinbelow, the housing 34 includes a drive motor 36 (see FIG. 5) and a coolant system 200 (see FIG. 6). The drive motor 36 as mentioned above drives a rotatable mixing member which in the preferred embodiment shown in FIG. 1-5 is an auger assembly 38. Auger assembly 38 is positioned proximate to a chiller assembly 40, both being retained within a corresponding hopper assembly 32. It should be noted that while a two-hopper apparatus is shown in FIG. 1, it may be desirable to provide a single hopper as well as three or more hoppers. The term hopper as used herein means any enclosure for holding a chilled, frozen or partially frozen liquid beverage of a beverage dispensing system. A general example of a machine using the improved structure and methods as disclosed is provided in U.S. Pat. No. 6,058,721, issued May 9, 2000, assigned to the assignee of this application and incorporated by reference in its entirety.

Figure 3:
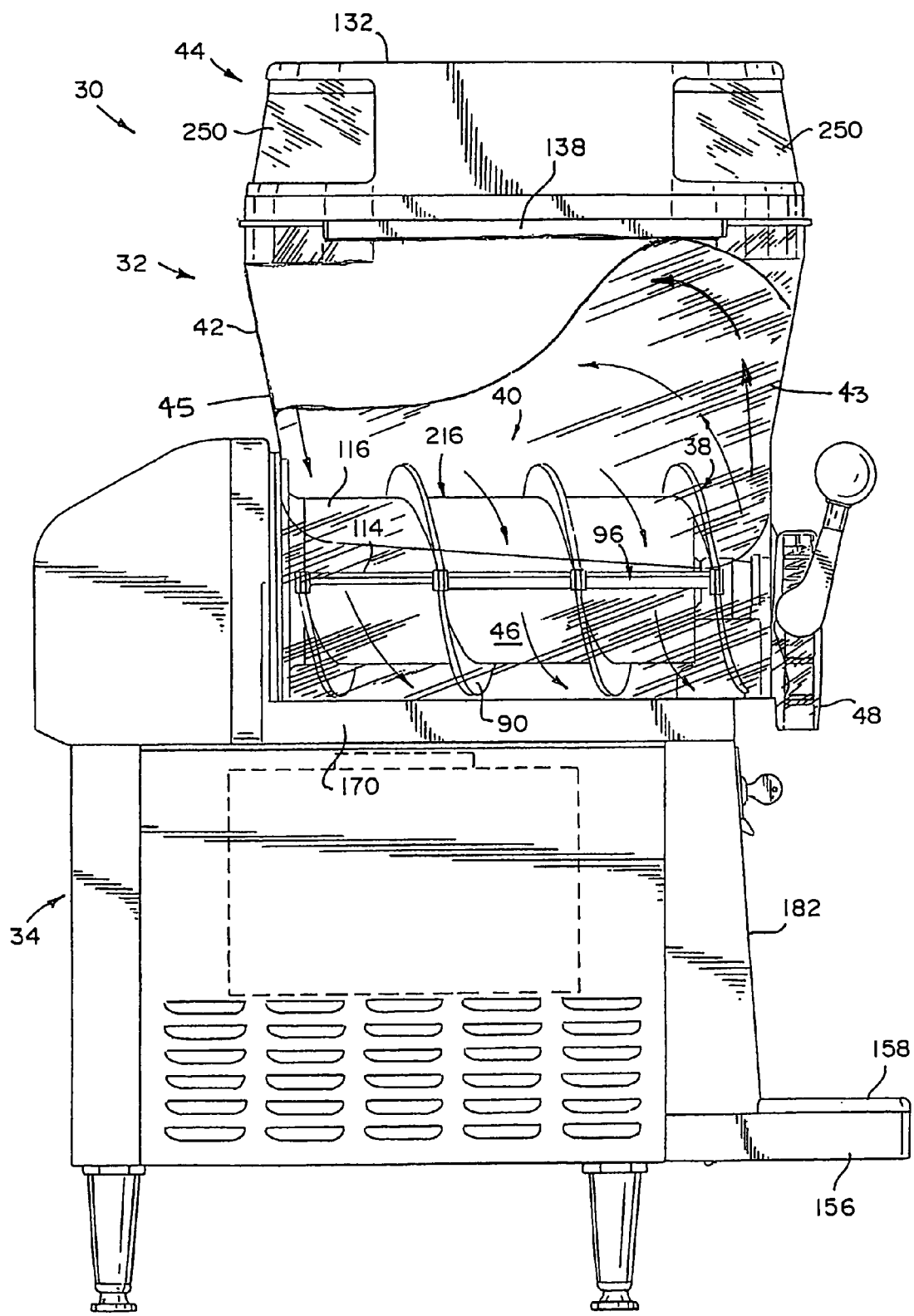
FIG. 3 is an enlarged left-side; elevational view of the apparatus as shown in FIGS. 1-3 showing the auger in the forward rotation mode of operation illustrating the formation of an "ice hump" during a freeze down event prior to reverse rotation.

Briefly, the apparatus 30 is operated by placing a beverage solution in a selected hopper 42 of the hopper assembly 32, positioning a cover assembly 44 on top of the hopper 42 and activating the apparatus. Initial activation of the apparatus will result in rotation of the auger assembly 38 within the hopper and initiation of a new cooling cycle or "freeze down," as it is commonly known. Cooling is provided by the chiller assembly 40 which maintains the external surface 46 of the chiller assembly 40 at, or preferably below 32° F., during the "freeze down" period so that the beverage is chilled to a partially frozen consistency. As external surface 46 of the chiller assembly 44 begins to cool, the temperature of the beverage solution is decreased. The auger 38 revolves to mix the beverage solution within the hopper 42. The auger assembly 38 includes a helically configured blade which is positioned in close proximity to the external surface 46 of the chiller assembly 40. As the beverage solution is cooled, ice crystals form in the solution. The ice crystals generally form on or near the surface 46 of the chiller assembly 40, and the auger assembly 38 removes these crystals from the surface 46. During normal operation, the auger 38 rotates in a counter-clockwise or forward direction which pushes the frozen ice crystals toward the front end 43 of the hopper 34 as shown in FIG. 3. Forward rotation operation of the auger 38 causes the mixture to be pulled from the back end 45 of the hopper into the auger path, and when the mixture reaches the front of the hopper, it is pushed upwardly over the auger. Such "freeze down" conditions can lead to formation of an "ice hump" (FIG. 3) which, as explained above, can slow completion of the "freeze down" event. When the "freeze down" event is completed or substantially completed, the partially frozen beverage may be dispensed through a dispensing nozzle 48 into a container 50 positioned therebelow.

Having now briefly described the general structure and operation of the present invention, we now turn to a more detailed discussion of the various structures of the apparatus. More particularly, we turn to FIG. 5 which shows a motor shaft assembly 52. The motor shaft assembly 52 is connected to the drive motor 36. Operation of the drive motor 36 rotates the motor shaft assembly 52 attached thereto and correspondingly rotates the auger assembly 38 attached to a distal end 54 of the motor shaft assembly 52. It should be noted, that in the present invention, the motor shaft assembly 52 extends through a hollow bore 56 within the chiller assembly 40 as seen schematically in FIG. 6. When the drive motor 36 is operated, the rotation of the motor shaft assembly 52 drives the auger assembly 38 causes movement of the beverage solution through the hopper 42. Preferably, the drive motor 36 is a direct current motor so that reversing the direction of current flow through the motor will cause reverse rotation of the motor 36, shaft assembly 54, and auger assembly 38.

Figure 6:
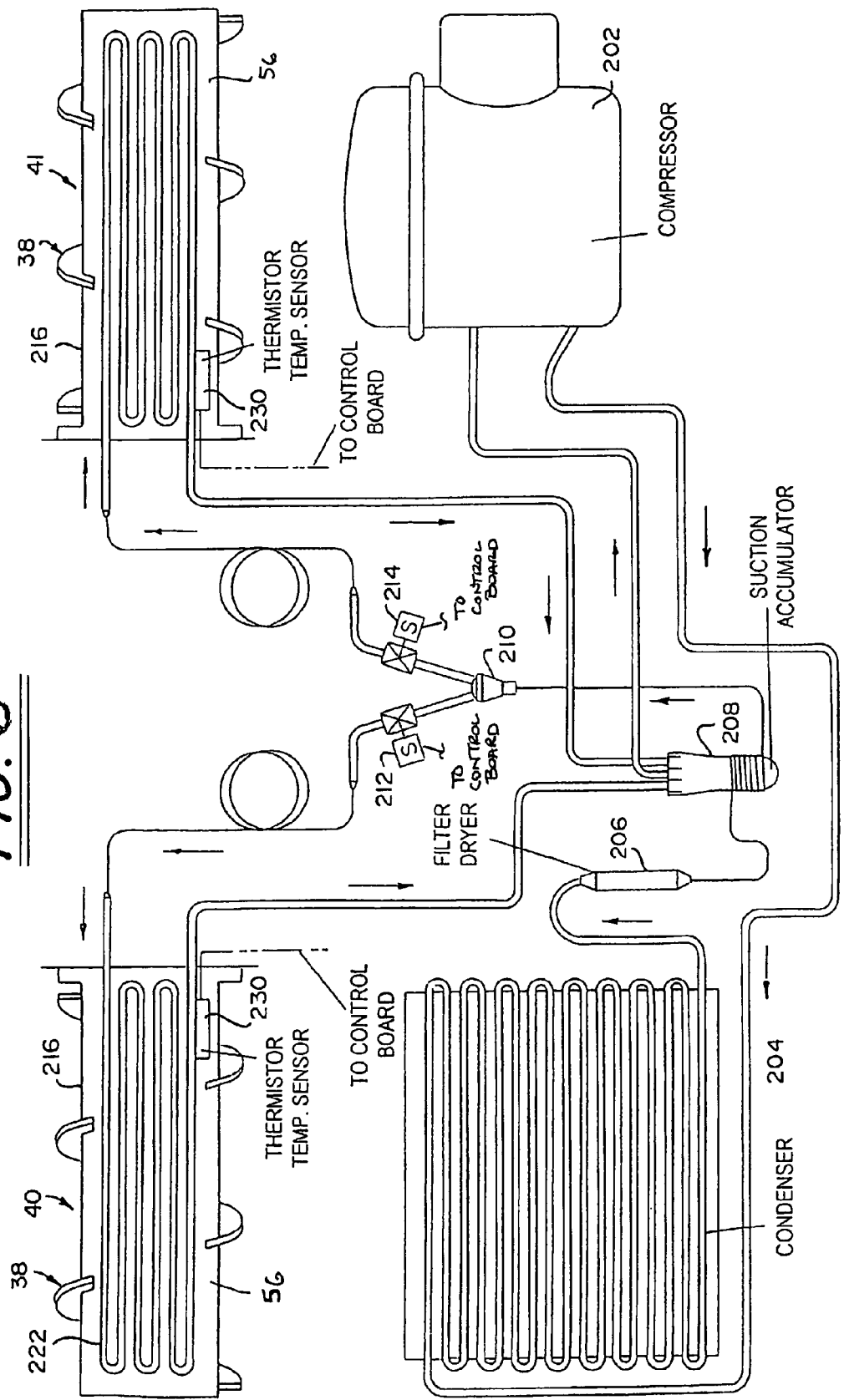
FIG. 6 is a diagrammatic illustration of the coolant system employed in the present invention.

Turning now to FIG. 6, the coolant system 200 of the present invention is shown diagrammatically in FIG. 6. The coolant system 200 includes a compressor 202, a condenser 204, a filter dryer 206 and a suction accumulator 208. As shown in FIG. 6, the coolant system provides coolant distribution to a pair of chiller assemblies 40, 41. Coolant is distributed to one or both of the chiller assemblies 40, 41 depending upon whether chilling is needed in one or both hopper 42. Selective control of coolant to the chiller assemblies 40, 41 is achieved by using a splitter 210 and a pair of controllable solenoid valves 212, 214.

As indicated in FIG. 6, the auger assembly 38 moves relative to the fixed drum 216 so as to spread and move beverage mixture along the outside surface 46 thereby transferring heat from the beverage mixture to the coolant flowing through coil 222. A thermistor temperature sensor 230 is provided internally of the chiller assembly 40 and is connected to a control circuit as indicated in FIG. 7.

Figure 7:
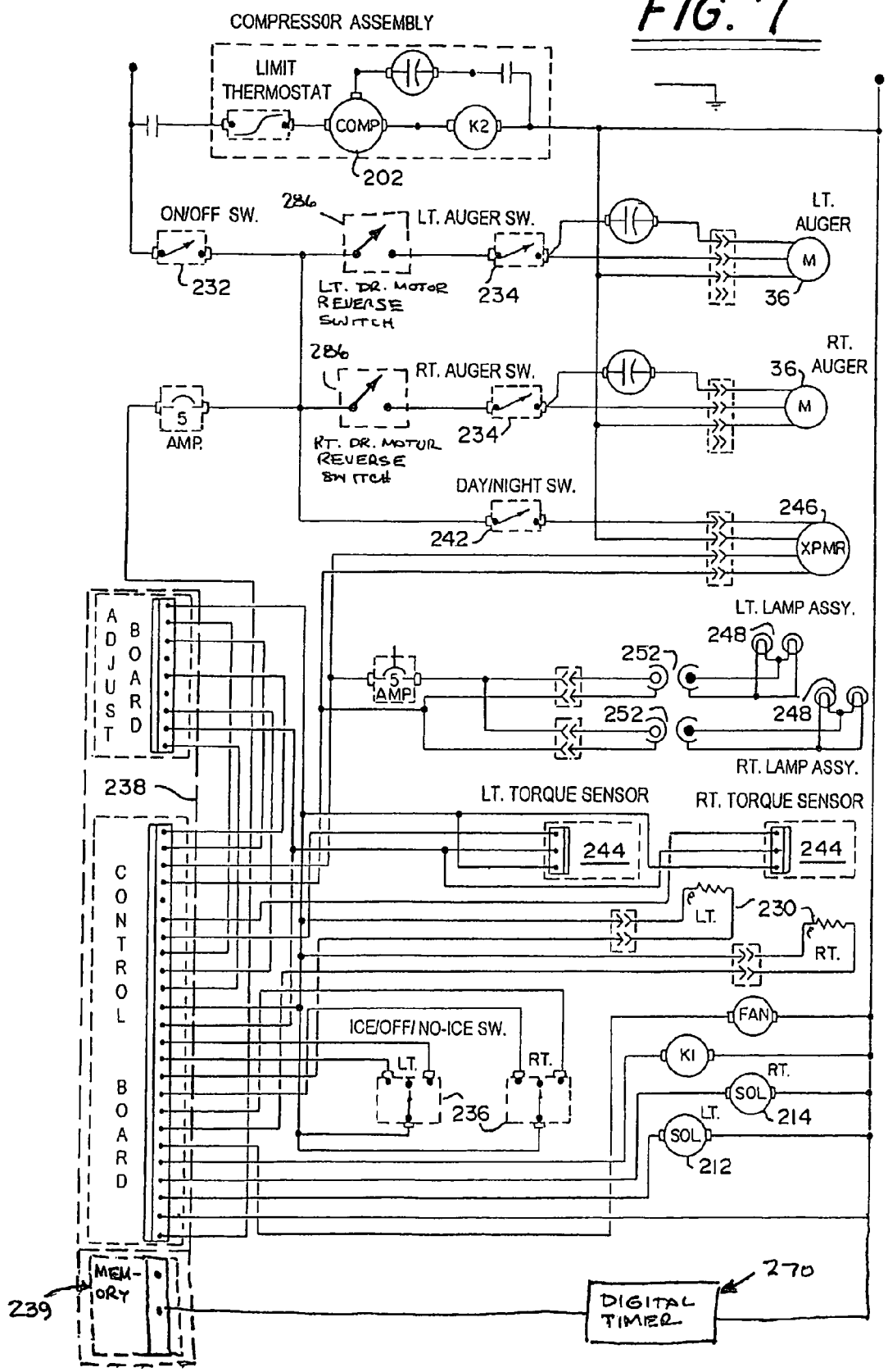
FIG. 7 is an electrical schematic of the control system employed in the present invention.

Turning now to the electrical schematic as shown in FIG. 7, the present system includes generally redundant left and right assemblies. As such, reference to each assembly will be made by using identical reference numerals where possible. Further, reference numerals indicated hereinabove will generally be used to indicate the same elements illustrated diagrammatically in the schematic of FIG. 7.

With reference to FIG. 7 and additional reference to FIG. 7, the system includes a main power switch 232 which controls power to the overall system. Additionally, each hopper and chiller assembly have a separate auger switch 234 which controls the power to the corresponding motor 236. Control of the chilling of beverage is achieved by use of the ice/no-ice switches 236 which are coupled to a control circuit or controller 238. The controller 238 also has a digital timer 270 which records the elapsed time for the current operations performed by a number of components of the apparatus 30 and stores that information including the mode of operation and length of the time period in controller memory 239. The components for which the timing of operations are recorded and stored preferably include ice/no ice switches 236, thermistor 230, torque sensor 244, and drive motor 36.

The action of solenoid valves 212, 214 is also controlled by controller 238. In the "ice" position of valve 236, the valves are controlled in response to the torque measurement from sensor 244. In the "no-ice" position, the valves are controlled in response to the temperature sensed by thermistor 230 as compared to a desired value (typically 37° F.) stored in the controller 239 memory. Variable resistors 240 allow the user to set the torque which yields the desired slush stiffness when 236 is in the "ice" position. The compressor is switched on or off by the controller 238 in a way which maximizes its life by reducing wear and tear. Controller memory 239 also stores the amount of time elapsed when one or more of the solenoid valves 212, 214 is maintained in the "ice" position.

When one or more of the beverage hoppers 34 are in "freeze down" mode, corresponding solenoid valve 212 or 214 is maintained in the "ice" position for extended periods to convert warmed beverage to partially frozen beverage as rapidly as feasible. The thermistor will typically sense a temperature of 32° F. or less during such extended periods. The maintenance of the solenoid valve in the "ice" position and/or the sensing of a sufficiently low temperature at the thermistor for periods of between 3 and 10 minutes are reliable indicia of the desirability of rotation reversal of the auger 38. It has been noted that these conditions are frequently associated with formation of an "ice hump" within the beverage hopper 42. Preferably, the controller is programmed to recognize the elapse of the occurrence of such events for a predetermined period of time within those time frames. The digital timer 270 is operably connected to the controller memory 239 which is programmed to record the duration of the maintenance of the solenoid valve in the "ice position," the sensing of a sufficiently low temperature by the thermistor, or other rotation reversal conditions.

A number of other operating conditions, such as refilling the machine, restart of the machine after cleaning, reactivation after a prolonged period of warmer hopper conditions ("switch-on" after "night mode") also correlate with formation of an "ice hump." For purposes of this application, those conditions also may constitute rotation reversal condition within a beverage hopper 42. More generally, a rotation reversal condition is any condition within the beverage hopper 32 which indicates less than desirable beverage mixing is occurring including, for example "ice hump" formation during "freeze down," stagnant areas formation during forward rotation operation, a full or partial refill of the beverage hopper, or the occurrence of any other operation condition in which optimum mixing efficiency is desired.

In response to detection of a rotation reversal condition, the controller 38 generates a rotation reversal signal which is communicated to the drive motor 36. In response to the rotation reversal signal, the drive motor 36 ceases rotation in the forward direction and begins to rotate in the reverse direction. Preferably, the drive motor 36 is a direct current motor and reversal merely requires actuation of a drive motor reverse switch 286 which interrupts the current flow and reverses the polarity of the current flowing through the drive motor 36. The reversal of the drive motor 36 causes reverse rotation of the motor shaft assembly 52 which thereby causes reverse rotation of the auger assembly 38. The rotation reversal signal preferably disables the torque sensor 244 since during reversal of the motor wide fluctuations in the torque are sensed. These fluctuating torque values do not provide useful data for assessing the quality of the frozen beverage in the hopper.

Figure 4:
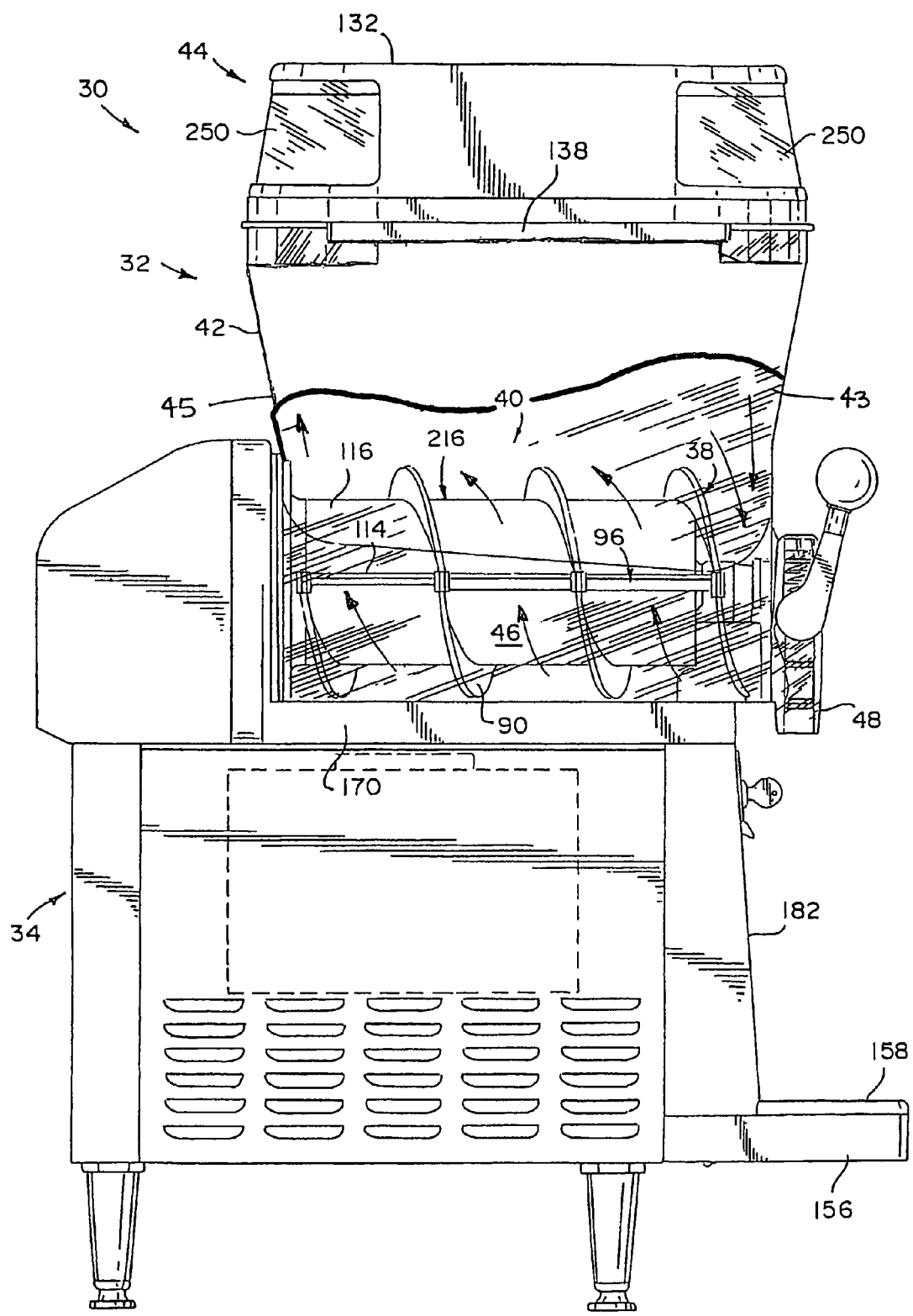
FIG. 4 is the apparatus of FIG. 3 showing the auger in the reverse rotation mode of operation with arrows illustrating the direction of flow of the beverage.
Figure 5:
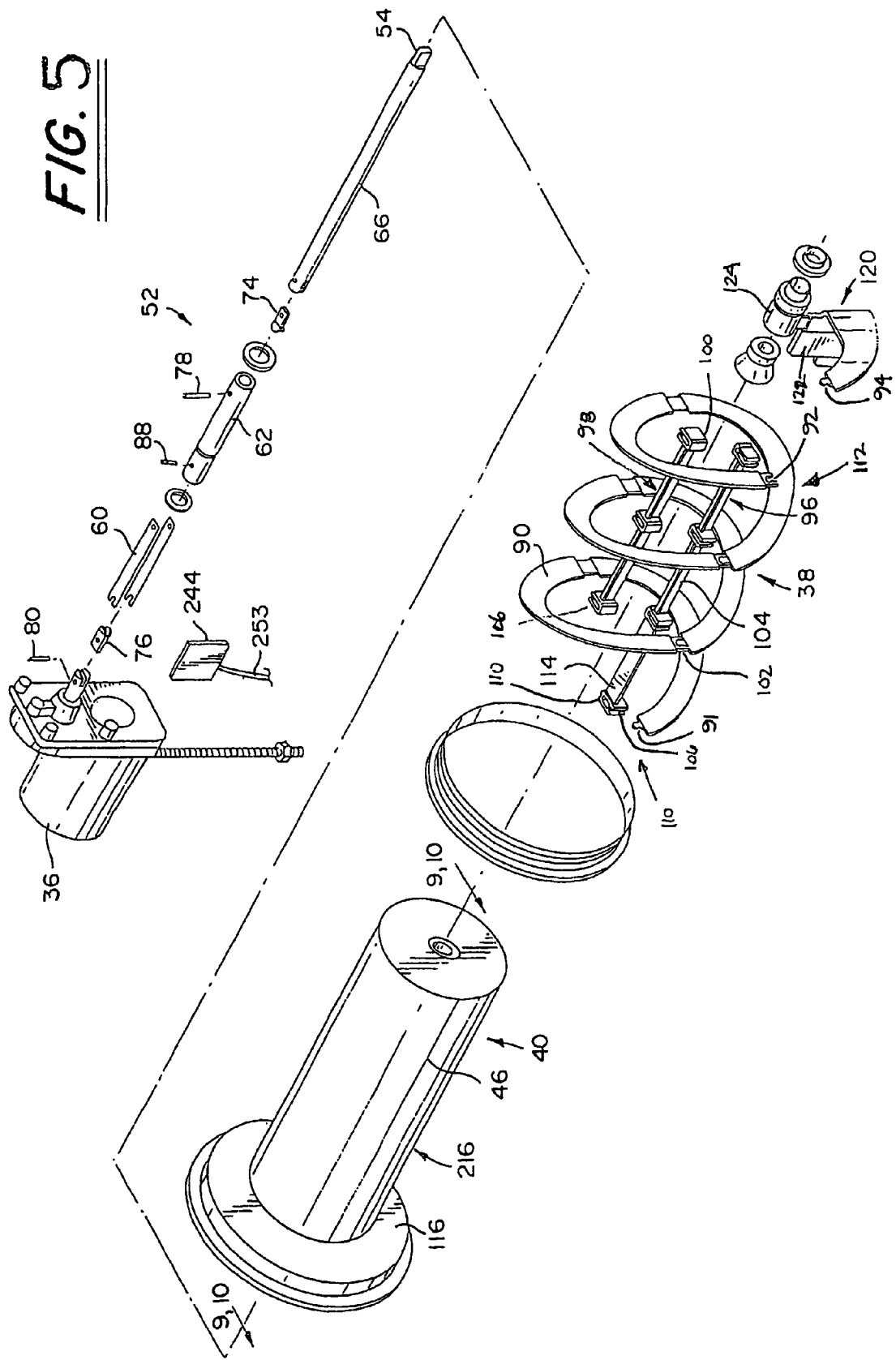
FIG. 5 is an exploded, perspective view of an auger assembly, chiller assembly, and motor shaft assembly.

As can be best seen in FIG. 4, the reverse rotation of auger assembly 38 draws partially frozen beverage down from the top, front end 43 of the beverage hopper 42 and moves it toward the back end 45. In this way, any "ice hump" that has formed or has begun to form is mixed back in with the remainder of the beverage product. During a "freeze down" event this results in more rapid cooling of the remainder of the beverage product which, early in the freeze down cycle, is mostly warmer liquid beverage. It has been found that the preferred time period for reverse rotation before switching the rotation of the auger 38 back into the forward direction is approximately two minutes, although other time periods may be used if desired. After the auger 38 has been in reverse rotation for a period of about two minutes, typically any "ice hump" condition will have been either prevented, reduced, or substantially eliminated. During a prolonged "freeze down" event, it is preferred to cycle the auger 38 between forward rotation and reverse rotation operations to maximize efficient mixing of the beverage product and thereby speed conclusion of the "freeze down" event. The attainment of the desired product consistency constitutes termination of the "freeze down" event.

The preferred cycle for rotation reversal during a prolonged "freeze down" event is as follows: about ten (10) minutes of forward rotation of the auger from commencement of the event (preferably a ten minute period of the thermistor 230 sensing a temperature of about 32° F. and/or solenoid 212 or 214 valve in "ice" position), about two (2) minutes of reverse rotation, followed by about eight (8) minutes of forward rotation, followed by about two (2) minutes of reverse rotation, followed by about three (3) minutes of forward rotation, and two (2) minutes of reverse rotation. The cycle of about three (3) minutes of forward rotation followed by two (2) minutes of reverse rotation preferably continues until the torque sensor 244 senses that the partially frozen beverage product has reached the desired torque valve during forward rotation. At this point, switch 236 turns solenoid valve 212 or 214 to the "no ice" position, and the drive motor 36 is maintained in the forward rotation mode for an extended period, typically about an hour. Shorter "freeze down" cycles are possible and preferably reverse rotation is terminated as soon as torque sensor 244 reaches the desired torque value during forward rotation, which may occur after a single rotation reversal or a prolonged cycle as exemplified immediately above.

From time to time during forward rotation periods, the sensed temperature at the thermistor 230 or of the torque of values sensed by the torque sensor may decrease below a pre-determined setting. In this case, the controller 238 will re-engage the chilling unit 40 and activate switch 236 to an "ice/on" position. Typically, such maintenance activation of the chilling assembly 40 will not generate a rotational reversal condition. However, after about an hour of forward rotation, stagnate areas tend to form within the beverage hopper 42, these stagnant areas typically form in the corners of the hopper 42. The stagnate areas are typically visible as lighter colored areas within the beverage hopper when a colored beverage is being served. This is due to the colored liquid portion of the semi-frozen beverage having a tendency to separate from the ice crystals portion of the semi-frozen beverage. The stagnant areas are both visually unappealing to customers and can lead to less than the desired consistency of product during serving. For these reasons, the forward rotation of the auger for a predetermined extended period, preferably about 60 minutes, may also be designated a rotation reversal condition which requires enhanced product mixing. When the timer 270 records and memory controller stores 239 forward rotation for a pre-determined extended period, the controller 238 generates a rotation reversal signal and the drive motor 36, drive shift assembly 52, and auger 38 are driven in the reverse rotation direction for a period of two minutes. The reverse rotation causes the partially frozen beverage to flow toward the back end 45 of the machine and reintegrates the stagnant areas of partially frozen beverage with the remainder of the beverage hopper contents. In this way, the formation of stagnant areas within the hopper can be reduced or prevented which can result in more consistent product quality and greater aesthetic appeal. After the timer 270 records the expiration of the two minutes of reverse rotation, the controller 238 generates a forward rotation signal which is communicated to the drive motor 36. In response, the drive motor 36, drive shift assembly 52, and auger 38 resume forward rotation until another reversal condition is detected by one or more of the sensing members.

It is to be understood that a variety of "sensing members" can be used to detect a rotation reversal condition. For example, one or more of the following structures, alone or in combination, may act as sensing members for purposes of this application, including, at least, the thermistor 230, the digital timer 270, the controller memory 239, the controller 238, and/or operator controlled input. These structures, alone or in combination, are capable of detecting a number of different rotation reversal occurrence which requires increased mixing efficiency within a beverage hopper 42.

The following exemplifies the alternate use of several of the structures as a sensing member. Certain granita machines can be provided with an automatic refill apparatus (not shown) that provide additional liquid beverage to the beverage hopper 32 in response to detection of a low beverage volume. In which case, the addition of a certain volume of liquid beverage from the refill apparatus may be a defined rotation reversal condition. This rotation reversal condition may be detected in a variety of ways. The controller may be programmed to automatically enter a reverse rotation cycle when a refill signal from the automatic refill apparatus. Preferably, the programming includes a timed delay of at least several minutes from the addition of the liquid beverage to the beverage hopper 32 to allow an initial period of forward rotation.

Still further, the rotation reversal condition may constitute manual cleaning, manual machine refilling or switching into standard "day time" mode of operation after termination of a prolonged "night time" mode of operation. As all of the conditions are likely to result in a "freeze down" event, the controller may be programmed to respond to detection of these events by automatically entering a reverse rotation cycle, preferably, after a timed delay to allow a predetermined period of forward rotation. These events may be detected by either operator input to the apparatus controls or by detection of machine conditions indicative of these events. For example, in the "night time" mode operation, machines are typically raised several degrees above optimal serving temperature to re-integrate all ice crystals into the beverage mixture. When the machine is reset for "daytime" operation, the thermistor registers the higher than optimal serving temperature and enters a "freeze down" mode of operation. Rather than detecting the occurrence of an "ice on" position for the solenoid for a period of time and/or a low thermistor temperature for a period of time, the controller may be programmed to automatically enter a reverse rotation cycle mode of operation, including alternating reverse and forward rotation periods, upon the controller detecting the reset to "day time" operation.

Alternately, the reverse rotation mode may be manually selected by the operator as desired to ensure optimal mixing. In this case, a suitable control switch on controller operations panel (not shown) is provided which is operably linked to the controller 23. In this last example, the control switch or control panel acts as a manually operating sensing member for detecting a rotation reversal signal. This manual selection is to be distinguished from the operation of automatic sensing members described above which are generally preferred to minimize the amount of operator involvement in efficient machine operation.

Turning now in more detail to the auger assembly 38, which is driven by the motor 36 and the motor shaft assembly 52, the auger assembly 38 as shown includes three auger sections 90. As can be seen in FIG. 7, three identical auger sections 90 are connected by interlocking structures 91 on opposite ends thereof. As shown in FIG. 8, an interlocking recess 92 is provided on one end of the auger section 90 while an interlocking protrusion 94 is provided on the opposite end of the auger section 90. By connecting the interlocking portions 92, 94, the auger sections 90 can be coupled to create the larger continuous helical blade of the auger assembly 38.

These auger sections 90 are retained in engagement by auger latch bars 96, 98 which have clips 100 for engagement with necked areas 102 on the auger sections 90. The clips are attached to and spaced apart by cross members 104. The clips 100 are configured with a reduced dimension mouth 106 to provide snap-fit engagement over the necked areas 102. The necked areas 102 are also provided in the area where the interlocking structures 92, 92, 94 are mated. As such, the clips 100 also assure that the interlocking structures 91 will not become disengaged during rotation of the auger. The cross members 104 also provide desired spacing between the sections 90 to prevent shifting of the auger sections 90 during rotation. It should be noted that the auger latch bar 96 includes four clips which attach to a first 110 and a second 112 terminal end of the three attached auger sections 90. A cross member 114 positioned near the first terminal end is oriented generally perpendicular to the other cross members 104. The perpendicular cross member 114 provides a driving action on the beverage solution positioned towards the base 116 of the chiller assembly 40.

The second terminal end 112 positioned towards the front of the apparatus includes an auger nose 120 attached thereto. The auger nose 120 includes a sweeping blade 122. A cap end 124 of the auger nose 120 attaches to the distal end 54 of the motor shaft assembly 52. As such, connection of the cap end 124 to the motor shaft assembly 52 results in rotation of the auger assembly 38. Generally, driving forces are transferred from the motor shaft 52 to the auger nose 120. The series of auger sections 90 attached to the auger nose 120 are pulled or rotated around the outside 46 of the chiller assembly 40. In the forward rotation direction (counter clockwise) this driving and sweeping action pull the beverage mixture from the rear of the hopper towards the front of the hopper. In the reverse rotation direction (clockwise), the driving and sweeping action pulls the beverage mixture from the top of the front end 43 toward the bottom of the back end 45 of the hopper 42.

The applicant has provided description and figures which are intended as an illustration of certain embodiments of the invention, and are not intended to be construed as containing or implying limitation of the invention to those embodiments. It will be appreciated that, although applicant has described various aspects of the invention with respect to specific embodiments, various alternatives and modifications will be apparent from the present disclosure which are within the spirit and scope of the present invention as set forth in the following claims.

The claimed invention is:

1. An apparatus for producing a chilled or partially frozen beverage comprising:
   at least one beverage hopper for retaining a quantity of partially frozen beverage;
   a chilling unit for cooling the partially frozen beverage retained within the beverage hopper;
   the chilling unit having a portion at least partially extending into the hopper for chilling beverage retained therein;
   a rotatable mixing member for mixing the partially frozen beverage within the beverage hopper;
   the rotatable mixing member rotating on a generally horizontally oriented axis defined in the beverage hopper and relative to at least an external surface of the portion of the chilling unit extending into the hopper for moving partially frozen beverage away from the portion of the chilling unit extending into the hopper;
   a sensor for detecting an occurrence of a rotation reversal condition;
   a controller for generating a rotation reversal signal in response to the detecting the rotation reversal condition; and
   drive motor operably coupled to the controller and to the rotatable mixing member for rotating the rotatable mixing member in a first direction and in a second, reverse direction in response to a rotation reversal signal from the controller.

2. A method of mixing a partially frozen beverage within a beverage hopper of a cold drink system comprising the steps of:
   providing at least one beverage hopper for retaining a quantity of partially frozen beverage;
   providing a chilling unit for cooling the partially frozen beverage retained within the beverage hopper;
   providing a rotatable mixing member for mixing the partially frozen beverage within the beverage hopper;
   controllably rotating the rotatable mixing member on a generally horizontally oriented axis defined in the beverage hopper;
   providing a sensor for detecting an occurrence of a rotation reversal condition;
   providing a controller for generating a rotation reversal signal in response to the detecting the rotation reversal condition;
   providing a drive motor operably coupled to the controller for rotating the rotatable mixing member in a first direction and in a second, reverse direction;
   activating a drive motor to rotate a rotatable mixing member within the beverage hopper in a the first direction;
   sensing an occurrence of a rotation reversal condition within the beverage hopper;
   generating a rotation reversal signal in response to the sensing of the rotation reversal condition; and
   activating the drive motor to rotate the rotatable mixing member in a second, reverse direction in response to the rotation reversal signal.

3. The apparatus of claim 1, the sensor further comprising a temperature sensor coupled to the controller, the temperature sensor detecting the temperature of the beverage in the hopper and providing a temperature detecting signal to the controller.

4. The apparatus of claim 1, the sensor further comprising a torque sensor coupled to the rotatable mixing member and the controller, the torque sensor detecting the viscosity of the beverage in the hopper and providing a torque detecting signal to the controller.

5. The apparatus of claim 1, the sensor further comprising a timer coupled to the controller, the timer detecting a period of time during which the rotatable mixing member is rotated in the first direction and the second direction for controlling the mixing of the beverage in relation to time.

6. The apparatus of claim 1, the rotatable mixing member further comprising an axially rotatable auger for axial rotation relative to the chilling unit extending into the hopper.

7. The apparatus of claim 1, the drive motor further comprising a controllable DC motor coupled to the controller for being controllably driven in a first direction to move the beverage in the first direction and controllably driven in a second direction to move the beverage in the second direction.

8. The apparatus of claim 1, further comprising the chilling unit and the rotatable mixing member being positioned in the hopper in a generally horizontal orientation, rotation of the mixing member in a first direction generally moving the beverage towards the front of the hopper and rotation of the mixing member in a second direction generally moving the beverage away from the front of the hopper.

9. The apparatus of claim 1, further comprising the chilling unit being coupled to the controller for controllably operating the chilling unit to controllably reduce the temperature of the beverage in the hopper.

10. The apparatus of claim 1, further comprising the hopper being formed of a generally transparent material.

11. The method of mixing of claim 2, further comprising
    providing a temperature sensor coupled to the controller; and
    detecting the temperature of the beverage in the hopper with the temperature sensor; and
    providing a temperature detecting signal to the controller.

12. The method of mixing of claim 2, further comprising
    providing a torque sensor coupled to the rotatable mixing member and the controller;
    detecting the viscosity of the beverage in the hopper with the torque sensor; and
    providing a torque detecting signal to the controller.

13. The method of mixing of claim 2, further comprising providing a timer coupled to the controller;
detecting a first period of time during which the rotatable mixing member is rotated in the first direction; and
detecting a second period of time during which the rotatable mixing member is rotated in the second direction for controlling the mixing of the beverage in relation to time.

14. The method of mixing of claim 2, further comprising providing an axially rotatable auger; and
axially rotating the auger relative to the chilling unit.

15. The method of mixing of claim 2, further comprising providing a controllable DC motor coupled to the controller
controllably driving the DC motor in a first direction;
moving the beverage in the first direction;
controllably driving the DC motor in a second direction; and
moving the beverage in the second direction.

16. The method of mixing of claim 2, further comprising positioning the chilling unit and the rotatable mixing member in the hopper in a generally horizontal orientation;
rotating the mixing member in a first direction;
moving the beverage towards the front of the hopper;
rotating the mixing member in a second direction; and
moving the beverage away from the front of the hopper.

17. The method of mixing of claim 2, further comprising coupling the chilling unit to the controller; and
controllably operating the chilling unit to controllably reduce the temperature of the beverage in the hopper.

18. The method of mixing of claim 2, further comprising providing the hopper in a generally transparent material.

19. An apparatus for producing a chilled beverage comprising:
at least one beverage hopper for retaining a quantity of beverage, the hopper defining at least a front end thereof
a chilling unit for chilling the beverage retained in the hopper;
the chilling unit having a portion at least partially extending into the hopper for chilling beverage retained therein;
a controller;
the chilling unit being coupled to the controller for controllably operating the chilling unit to control the temperature of the beverage in the hopper;
a drive motor associated with the apparatus, the drive motor being coupled to the controller for controllably driving the motor in a first direction and in a second, reverse direction;
an axially rotatable auger positioned on a generally horizontally oriented axis defined in the beverage hopper and proximate to an exterior surface of the chilling unit, the auger being coupled to the drive motor for controllable rotation along the generally horizontal axis relative to the chilling unit and mixing the beverage in the hopper;
the chilling unit and the auger being positioned in the hopper in a generally horizontal orientation, rotation of the auger in a first direction generally moving the beverage towards the front end of the hopper and rotation of the auger in a second direction generally moving toe beverage away from the front end of the hopper;
a sensor for detecting a rotation reversal condition, the sensor being coupled to the controller and
the controller generating a rotation reversal signal in response to the sensor detecting the rotation reversal condition.

20. The apparatus of claim 19, the drive motor further comprising
a controllable DC motor coupled to the controller for being controllably driven in a first direction to move the beverage in the first direction and controllably driven in a second direction to move the beverage in the second direction.

21. The apparatus of claim 19, the sensor further comprising
a temperature sensor coupled to the controller, the temperature sensor detecting the temperature of the beverage in the hopper and providing a temperature detecting signal to the controller.

22. The apparatus of claim 19, the sensor further comprising
a torque sensor coupled to the controller and at least one of the drive motor and the auger, the torque sensor detecting the resistance of the beverage to movement by the auger and providing a torque detecting signal to the controller.

23. The apparatus of claim 19, the sensor further comprising
a timer coupled to the controller, the timer detecting a period of time during which the auger is rotated in the first direction and the second direction for controlling the mixing of the beverage in relation to time.

24. The apparatus of claim 19, further comprising the hopper being formed of a generally transparent material.

25. A method of mixing a partially frozen beverage within a beverage hopper of a cold drink system comprising the steps of:
providing at least one beverage hopper for retaining a quantity of partially frozen beverage;
providing a chilling unit for cooling the partially frozen beverage retained within the beverage hopper;
providing at least a portion of the chilling unit extending into the hopper for chilling beverage retained therein;
providing a rotatable mixing member for mixing the partially frozen beverage within the beverage hopper;
controllably rotating the mixing member on a generally horizontally oriented axis defined in the beverage hopper relative to at least an external surface of the portion of the chilling unit extending into the hopper for moving partially frozen beverage away from the portion of the chilling unit extending into the hopper;
providing a sensor for detecting an occurrence of a rotation reversal condition;
providing a controller for generating a rotation reversal signal in response to the detecting the rotation reversal condition;
providing a drive motor operably coupled to the controller and to the rotatable mixing member for rotating the rotatable mixing member in a first direction and in a second, reverse direction in response to a rotation reversal signal from the controller;
activating a drive motor to rotate a rotatable mixing member within a beverage hopper in a first direction;
sensing an occurrence of a rotation reversal condition within the beverage hopper;
generating a rotation reversal signal in response to the sensing of the rotation reversal condition; and
activating the drive motor to rotate the rotatable mixing member in a second, reverse direction in response to the rotation reversal signal.

* * * * *